US006295489B1

United States Patent
Otsuka et al.

(10) Patent No.: US 6,295,489 B1
(45) Date of Patent: Sep. 25, 2001

(54) APPARATUS AND METHOD FOR DIAGNOSING A WHEEL SPEED INPUT SYSTEM IN A VEHICLE MOTION CONTROL APPARATUS

(75) Inventors: Yukihiro Otsuka; Kouji Kurasima; Hideki Toyota, all of Nagano (JP)

(73) Assignee: Nissin Kogyo Co, Ltd., Ueda (JP)

( * ) Notice: Subject to any disclaimer, the term of this patent is extended or adjusted under 35 U.S.C. 154(b) by 0 days.

(21) Appl. No.: 09/493,145

(22) Filed: Jan. 28, 2000

(30) Foreign Application Priority Data

Feb. 1, 1999 (JP) .................................................. 11-023850

(51) Int. Cl.[7] .............................. G06F 7/00; G06F 19/00
(52) U.S. Cl. ................................ 701/29; 701/34; 701/76; 701/93; 73/146.5
(58) Field of Search ................................ 701/29, 34, 63, 701/74, 76, 81, 121, 93; 73/146.5; 340/441

(56) References Cited

U.S. PATENT DOCUMENTS 5,753,809 * 5/1998 Ogusu et al. ........................ 73/146.2
5,864,582 * 1/1999 Ander et al. ........................ 375/238

* cited by examiner

Primary Examiner—William A. Cuchlinski, Jr.
Assistant Examiner—Gertrude Arthur
(74) Attorney, Agent, or Firm—McGuireWoods LLP

(57) ABSTRACT

An apparatus for diagnosing a wheel speed input system used in a vehicle motion control apparatus includes wheel speed sensors that output analog signals indicative of the speed of various wheels. The analog waveforms from the sensors are converted into pulse signals which are fed to an electronic control unit. The control unit controls an actuator that affects vehicle motion. In addition, the control unit judges whether or not the pulse signals from the wheel speed sensors are less than a minimum wheel speed that can be effectively detected by the sensors. The electronic control unit converts the analog signals into digital signals at a preset sampling cycle. When a variation of digital values exceeds a threshold value, the electronic control unit judges whether an error arose in the conversion of the waveforms or between the electronic control unit and the transmitted pulse signals.

11 Claims, 4 Drawing Sheets

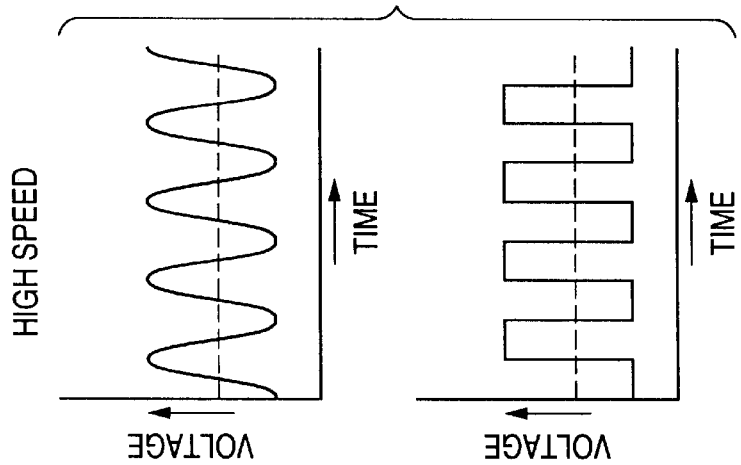
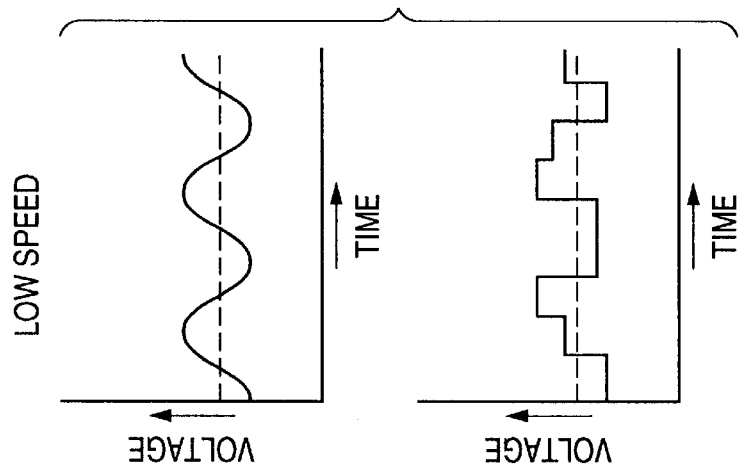
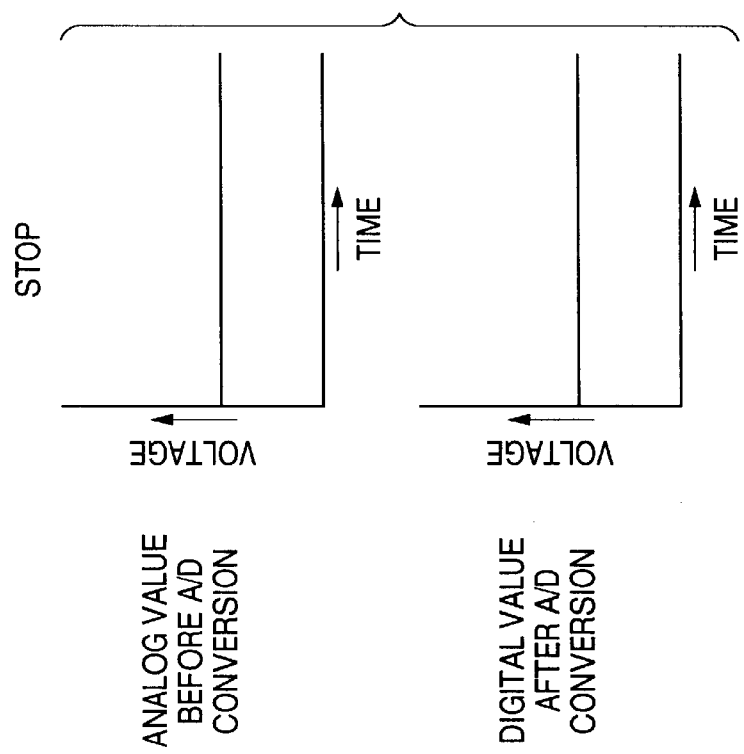

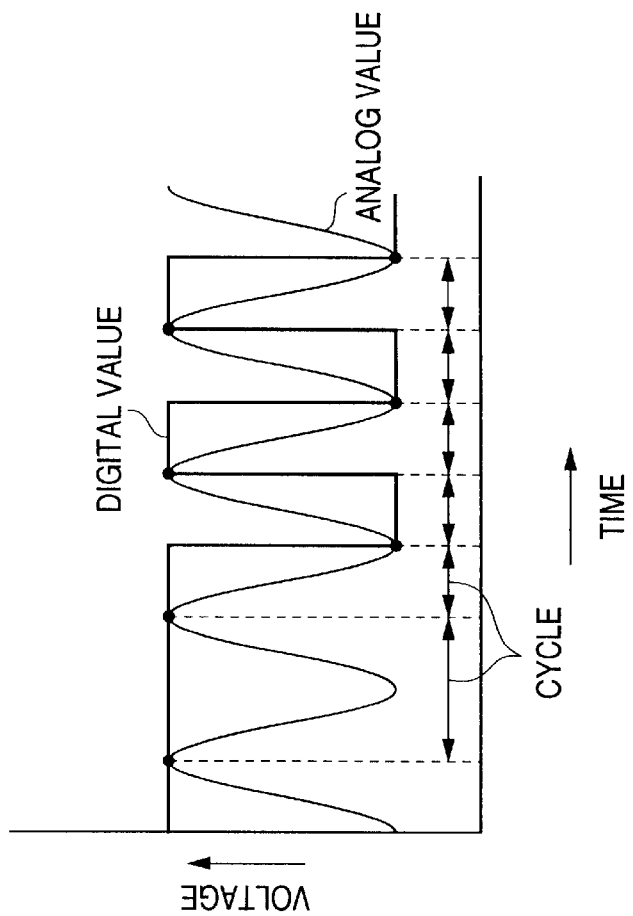
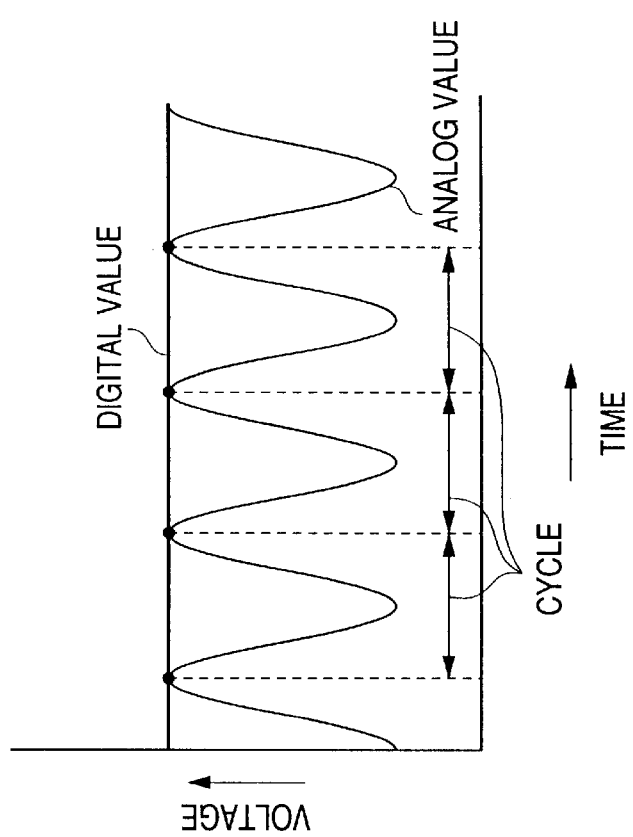

APPARATUS AND METHOD FOR DIAGNOSING A WHEEL SPEED INPUT SYSTEM IN A VEHICLE MOTION CONTROL APPARATUS

BACKGROUND OF THE INVENTION

The present invention relates to an apparatus and method for diagnosing a wheel speed input system in a vehicle motion control apparatus. The vehicle motion control apparatus comprises wheel speed sensors, a plurality of waveform converting means and an electronic control unit. The wheel speed sensors, which correspond individually to a plurality of wheels, output analog signals respectively. The respective waveform converting means convert the analog signals to obtain pulse signals. Then the electronic control unit controls an operation of an actuator which can modify a motion of a vehicle based on the pulse signals obtained at the respective waveform converting means. In the vehicle motion control apparatus, the diagnostic apparatus diagnoses a failure as existing in the respective waveform converting means themselves, and between the waveform converting means and the electronic control unit.

The above-mentioned diagnostic apparatus is known, for instance, in Japanese Patent Unexamined Publication No. Hei 2-114053 and 5-147477.

The Japanese Patent Unexamined Publication No. Hei 2-114053 discloses a diagnostic apparatus. In a vehicle motion control apparatus, respective waveform converting means, which correspond individually to a plurality of wheel speed sensors, output pulse signals. Then wheel speeds based on pulse signals obtained from respective waveform converting means are compared with wheel speeds based on pulse signals from other waveform converting means. Thus a failure is diagnosed as existing in the waveform converting means, and between the waveform converting means and an electronic control unit. However, in a case where some wheels have wheel diameters different from those of other wheels, for example, in a case where one wheel is changed to new one having a different wheel diameter because a flat tire of the wheel, it may be judged mistakenly that there exists a failure therein. In another case where all the waveform converting means are integrated in a single IC chip, there is a possibility that the respective waveform converting means fail all together at one time. In this case, it is impossible to diagnose a failure.

In addition, the above-mentioned Japanese Patent Unexamined Publication No. Hei 5-147477 discloses the other diagnostic apparatus. In a vehicle motion control apparatus, detected signals from a plurality of wheel speed sensors are inputted in parallel into a first microcomputer and a second microcomputer. The first microcomputer controls a operation of an actuator, and the second microcomputer monitors an operation of the first microcomputer as a monitoring device. A failure in a wheel speed input system is diagnosed by comparing operation results by the two microcomputers. However, such a construction makes the system redundant and operations complicated. Accordingly, a cost of the apparatus increases.

SUMMARY OF THE INVENTION

Accordingly, an object of the present invention is to provide an apparatus and method for diagnosing a failure of a wheel speed input system in a vehicle motion control apparatus. The apparatus, which is simple in construction, diagnoses a failure as existing in at least either of waveform converting means themselves, and between the waveform converting means and an electronic control unit, even if some wheels have wheel diameters different from those of other wheels or the waveform converting means fail all together at one time. The failure as existing between the waveform converting means and the electronic control unit is, for instance, a disconnection or a short circuit.

The above-mentioned object can be achieved by an apparatus for diagnosing a wheel speed input system in a vehicle motion control apparatus, according to the present invention, comprising a first wheel speed sensor outputting a first analog signal corresponding to a wheel speed of a first wheel, a second wheel speed sensor outputting a second analog signal corresponding to a wheel speed of a second wheel, a first waveform converting means for converting the first analog signal into a first pulse signal, a second waveform converting means for converting the second analog signal into a second pulse signal and an electronic control unit. The electronic control unit controls an operation of an actuator which modifies a motion of a vehicle in response to the first and second pulse signals, receives first and second analog values outputted from the first and second wheel speed sensors, and judges whether or not each of the first and second waveform converting means outputs a third pulse signal which is in correspondence with a wheel speed equal to or less than a minimum wheel speed that can be detected with the first and second wheel speed sensors. The electronic control unit converts the first analog values into a first digital value at a predetermined sampling cycle when the electronic control unit judges that the first waveform converting means outputs the third pulse signal, and judges a failure in at least either of an operation of the first waveform converting means itself and an operation between the first waveform converting means and the electronic control unit in accordance with a variation of adjacent digital values thus sampled at the predetermined sampling cycle.

In the above mentioned apparatus according to the present invention, it is advantageous that when the variation of the adjacent digital values exceeds a threshold value, the electronic control unit judges that there exists the failure.

Further, in the apparatus, it is preferable that the first and second wheel speed sensors comprises a front right wheel speed sensor, a front left wheel speed sensor, a rear right wheel speed sensor and a rear left wheel speed sensor.

Furthermore, it is preferable that the electronic control unit further converts the second analog values into a second digital value at a given sampling cycle when the electronic control unit judges that the second waveform converting means outputs the third pulse signal, and judges a failure in at least either of an operation of the second waveform converting means itself and an operation between the second waveform converting means and the electronic control unit in accordance with a variation of adjacent digital values thus sampled at the given sampling cycle.

However, the above-mentioned object can also be attained by a method for diagnosing a wheel speed input system in a vehicle motion control apparatus comprising, a first wheel speed sensor outputting a first analog signal corresponding to a wheel speed of a first wheel, a second wheel speed sensor outputting a second analog signal corresponding to a wheel speed of a second wheel, a first waveform converting means for converting the first analog signal into a first pulse signal, a second waveform converting means for converting the second analog signal into a second pulse signal, and an electronic control unit controlling an operation of an actuator which modifies a motion of a vehicle in response to the first and second pulse signals. The method according to the present invention comprises the steps of:

receiving first and second analog values outputted from the first and second wheel speed sensors;

judging whether or not each of the first and second waveform converting means outputs a third pulse signal which is in correspondence with a wheel speed equal to or less than a minimum wheel speed that can be detected with the first and second wheel speed sensors;

converting the first analog values into a first digital value at a predetermined sampling cycle when the electronic control unit judges that the first waveform converting means outputs the third pulse signal; and judging a failure in at least either of an operation of the first waveform converting means itself and an operation between the first waveform converting means and the electronic control unit in accordance with a variation of adjacent digital values thus sampled at the predetermined sampling cycle.

In the above-mentioned method according to the present invention, it is advantageous that the failure judging step comprises the step of judging that there exists the failure when the variation of the adjacent digital values exceeds a threshold value.

Further, in the above-mentioned method according to the present invention, it is advantageous to further comprises the steps of:

converting the second analog value into a second digital value at a given sampling cycle when the electronic control unit judges that the second waveform converting means outputs the third pulse signal; and judging a failure in at least either of an operation of the second waveform converting means itself and an operation between the second waveform converting means and the electronic control unit in accordance with a variation of adjacent digital values thus sampled at the given sampling cycle.

Moreover, the above-mentioned object can also be achieved by a diagnostic device for a wheel speed input system for a vehicle motion control device comprising:

wheel speed sensors corresponding individually to a plurality of wheels;

a plurality of waveform converting means for waveform converting analog signals outputted individually from the respective wheel speed sensors into individual pulse signals corresponding to wheel speeds of the respective wheel speed sensors; and an electronic control unit for controlling the operation of an actuator that can modify the motion of a vehicle in response to wheel speeds obtained based on outputs from the respective waveform converting means, wherein the electronic control unit judges whether or not the waveform converting means output a pulse signal corresponding to a speed equal to or less than a minimum wheel speed that can be detected with the wheel speed sensors with respect to each of the waveform converting means, and wherein when the electronic control unit judges that the waveform converting means output a pulse signal corresponding to the speed equal to or less than the minimum wheel speed, the electronic control unit judges that there exists a failure in at least either of the waveform converting means themselves which are outputting a pulse signal corresponding to the speed equal to or less than the minimum wheel speed and somewhere between the waveform converting means and the electronic control unit based on a fact that a variation of digital values which are obtained by converting at a predetermined sampling cycle analog values outputted from the wheel speed sensors corresponding to the waveform converting means so judged exceeds a threshold value.

According to the above construction, it is possible to surely judge a failure in the wheel speed input system which comprises the waveform converting means and the electronic control unit. In other words, in a case where pulse signals, which are outputted from the waveform converting means corresponding to wheel speeds, correspond to a speed equal to or less than the minimum wheel speed that can be detected with the wheel speed sensors, there are conceivable three conditions. These conditions are such as a condition in which there exists a failure in the wheel speed sensors themselves, a condition in which there exists a failure in at least either of the waveform converting means, and between the waveform converting means and the electronic unit, and a condition in which the vehicle is stopped. In these conditions, if the analog values outputted from the wheel speed sensors is converted into digital values at the predetermined sampling cycle, and then a variation of the digital values is equal to or greater than a certain magnitude, it can be judged that there exists no failure in the wheel speed sensors and the vehicle is running. Accordingly, if the vehicle is judged as running though the waveform converting means output only pulse signals corresponding to the speed equal to or less than the minimum wheel speed, it can be judged that a failure exists in at least either of the waveform converting means themselves, and between the waveform converting means and the electronic control unit. As a result, no effective pulse is being inputted into the electronic control unit. The failure in between the waveform converting means and the electronic control unit is, for instance, a disconnection or a short circuit. Moreover, a diagnosis is carried out with respect to each of the wheel speed sensors based on the variation of the digital values which are obtained by converting the analog values outputted from the respective wheel speed sensors in a state in which the wheel speed based on the pulse signals is equal to or less than the minimum wheel speed. Accordingly, even if some wheels have wheel diameters different from those of other wheels or the waveform converting means fail all together at one time due to them being integrated into a single IC chip, a failure diagnosis can surely be carried out. Further, since the diagnostic apparatus is constructed so as to diagnose a failure with the single electronic control unit without using two microcomputers, the circuit construction can be made simple.

In addition, in the above-mentioned diagnostic device, it is advantageous that the electronic control unit changes the sampling cycle at which analog values outputted from the wheel speed sensors are converted into digital values when the variation of digital values is equal to or less than the threshold value.

According to this construction, the change cycle of the analog values outputted from the wheel speed sensors is prevented from coinciding with the sampling cycle. Accordingly, it possible to avoid a risk of mistakenly judging that a variation of the digital values in a state in which the vehicle is running is equal to or less than the threshold value.

Features and advantages of the present invention will be described from following detailed description of preferred based on an embodiment of the present invention shown in the attached drawings.

BRIEF DESCRIPTION OF THE DRAWINGS

FIG. 3(a)–3(c) are respective diagrams showing comparisons between analog and digital signals in response to change in running condition of a vehicle; and FIG. 4(a), (b) are respective diagrams explaining the effectiveness obtained by changing a sampling cycle.

DETAILED DESCRIPTION OF THE PREFERRED EMBODIMENTS

Figure 1:
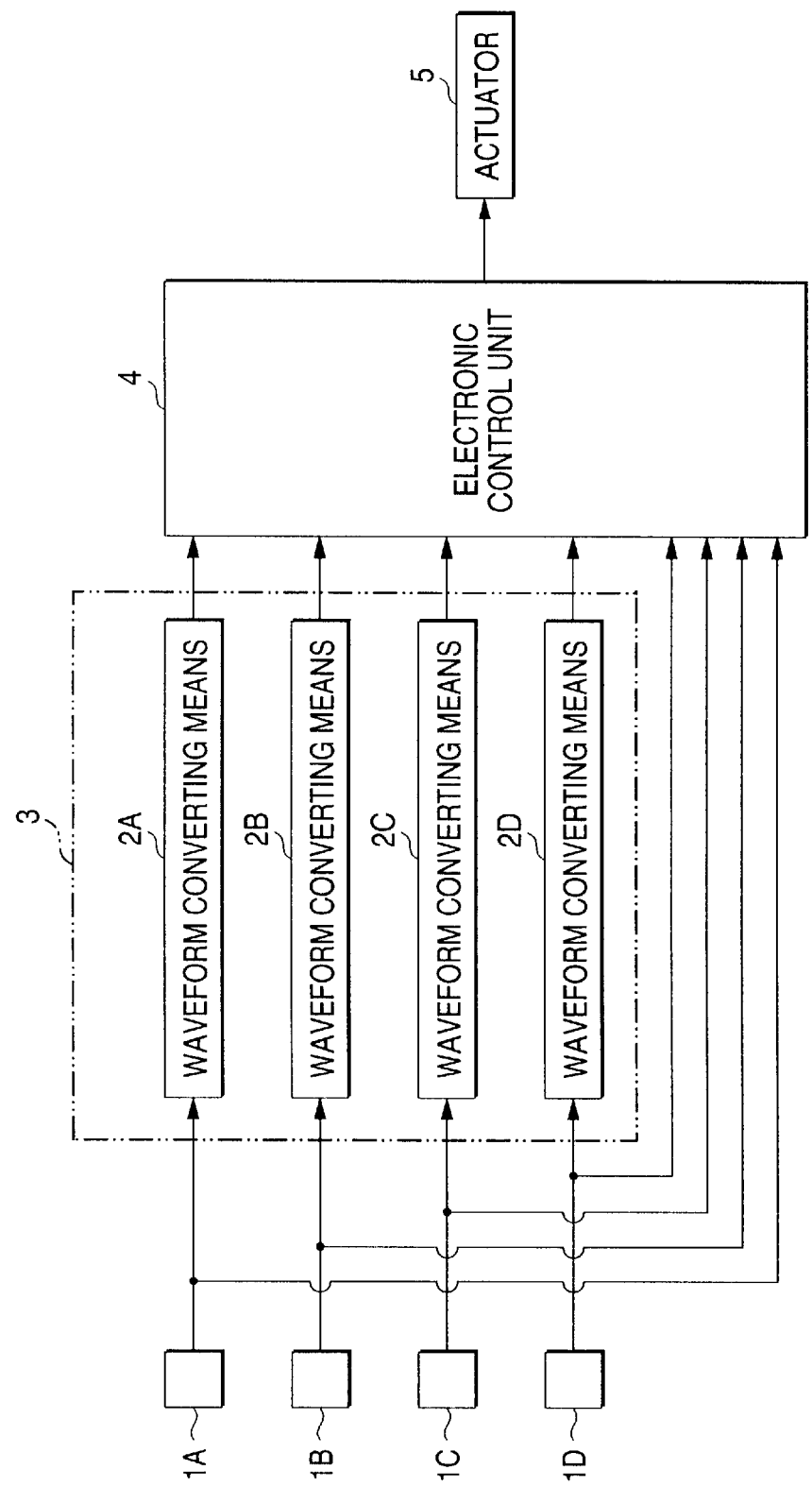
FIG. 1 is a block diagram showing an overall construction of a diagnostic apparatus.
Figure 2:
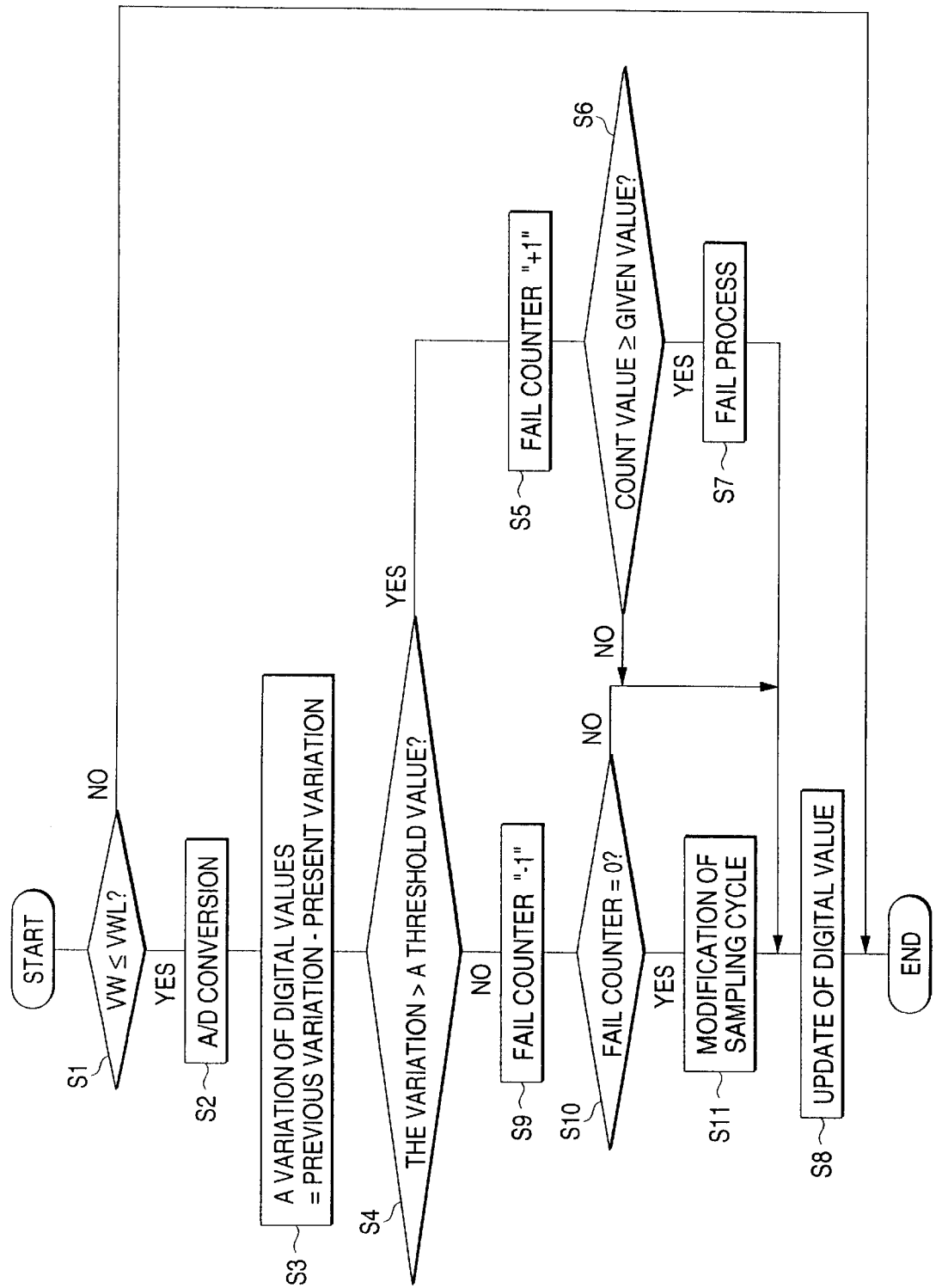
FIG. 2 is a flowchart showing a failure diagnostic processing procedure by an electronic control unit.

FIGS. 1 to 4 show an embodiment of the present invention. FIG. 1 is a block diagram showing an overall construction, FIG. 2 is a flowchart showing a failure diagnosis procedure by an electronic control unit, FIG. 3(a)–(c) show comparisons of analog and digital signals in response to change in running conditions of a vehicle, and FIG. 4(a), (b) are respective views explaining an effectiveness of changing a sampling cycle.

First of all, in FIG. 1, wheel speed sensors 1A, 1B, IC, 1D are mounted on respective wheels of a four-wheel vehicle. The respective wheel speed sensors 1A, 1B, 1C, 1D output analog signals based on wheel speeds of the respective wheels. Waveform converting means 2A, 2B, 2C, 2D which individually correspond to the respective wheel speed sensors 1A, 1B, 1C, 1D convert the analog signals into plus signals. Then, the pulse signals are inputted into an electronic control unit 4. The analog signals outputted from the wheel speed sensors 1A, 1B, 1C, 1D are also inputted into the electronic control unit 4 directly. In this embodiment, the respective waveform converting means 2A, 2B, 2C, 2D are integrated into a single input IC 3, however, the respective waveform converting means 2A, 2B, 2C, 2D may be constituted by an individual IC.

Analog signals outputted from the respective wheel speed sensors 1A to 1D are converted at the respective waveform converting means 2A to 2D, so that the pulses are obtained which correspond to wheel speeds of the respective wheels. The electronic control unit 4 has a function to control an operation of an actuator 5 based on wheel speeds obtained from outputs from the respective waveform converting means 2A to 2D.

The actuator 5 can change a motion of a vehicle, and for instance, it may change brake fluid pressures so as to change braking forces of the vehicle. The number of actuators are not limited to one, and it is possible to control a plurality of actuators 5 by the electronic control unit 4.

The electronic control unit 4 also has a function to diagnose a failure in a wheel speed input system which comprises the waveform converting means 2A to 2D and the electronic control unit 4. The electronic control unit 4 performs failure diagnostic processes following a procedure shown in FIG. 2, to the respective wheel speed sensors 1A to 1D. At Step S1, it is judged whether or not wheel speeds VW based on pulse signals obtained at the waveform converting means 2A to 2D are equal to or less than a minimum wheel speed VWL that can be detected with the wheel speed sensors 1A to 1D, for instance, 2 km/h. With VW>VWL, it is judged that the wheel speed input system is normal. With VW≦VWL, however, it is judged that there is a possibility that the wheel speed input system is failing, and therefore the procedure proceeds to Step S2.

At Step S2, when it is confirmed as VW≦VWL at Step S1, analog values outputted from the wheel speed sensors 1A to 1D corresponding to the waveform converting means, the wheel speed of which is judged as VW≦VWL, are converted into a digital value at a preset sampling cycle respectively.

Through this A/D conversion, digital values are obtained in response to changes in analog value in states in which the vehicle is stopped, the vehicle runs at a low speed and the vehicle runs at a high speed, as shown in FIGS. 3(a) to (c).

At the next step, Step S3, a variation of digital values is calculated by subtracting the digital value obtained at this time from the previous one. Then, at Step S4, it is judged whether or not the variation of digital values exceeds a threshold value.

At Step S4, when the variation of digital values is judged as exceeding the threshold value, in other words, when it is confirmed that the digital values obtained by converting the analog values at the preset sampling cycle varies such that they exceed the threshold value, it is judged that the vehicle is in a running state though only pulse signals corresponding to the speed equal to or less than the minimum wheel speed VWL are outputted from the waveform converting means 2A to 2D. Accordingly, it is judged that there is a possibility that the wheel speed input system which comprises the waveform converting means 2A to 2D and the electronic control unit 4 fails, and then the procedure proceeds from Step S4 to Step S5.

At Step S5, only "1" is added to a count value in a fail counter. Then, if the count value of the fail counter reaches a given value at Step S6, a fail process is executed by buzzing or stopping controlling the operation of the actuator 5 at Step S7, and then the procedure proceeds from Step S7 to Step S8. On the contrary, if the count value of the fail counter is judged as not reaching the given value at Step S6, Step S7 is skipped, and then the procedure proceeds to Step S8. At Step S8, the previous digital value is updated by the digital value obtained at this time.

At Step S4, when the variation of digital values is equal to or less than the threshold value, that is, the variation of digital values is small in a state in which only a pulse signal or pulse signals corresponding to the speed equal to or less than the minimum wheel speed VWL are outputted from the waveform converting means 2A to 2D, it is judged that there is the low possibility that the wheel speed input system which comprises the waveform converting means 2A to 2D and the electronic control unit 4 fails. Then the procedure proceeds from Step S4 to Step S9, where the count value of the fail counter is reduced only by "1".

At the next step, Step S10, it is judged whether or not the count value of the fail counter becomes "0". Then, when it is confirmed that the count value of the fail counter becomes "0", the sampling cycle is modified at Step S11. In other words, a plurality of, for instance, two sampling cycles that have different cycles respectively are preset in the electronic control unit 4, and if a digital value obtained through an A/D conversion at one of the sampling cycles remains equal to or less than the threshold value until the count value of the fail counter becomes "0", it is judged again whether or not a digital value exceeds the threshold value that is obtained through another A/D conversion at the other sampling cycle.

The change of the sampling cycles like this prevents an mistaken judgement that the variation of digital values is equal to or less than the threshold value by coincidence of the change cycle of analog values outputted from the wheel speed sensors 1A to 1D with the sampling cycle for the A/D conversion. In other words, if the sampling cycle remains constant as shown in FIG. 4(a), the change cycle of analog values outputted from the wheel speed sensors 1A to 1B comes to coincide with the sampling cycle. Accordingly, there is a possibility that a variation of digital values cannot be obtained ever though the analog values change. As shown in FIG. 4(b), however, changing the sampling cycle prevents the coincidence of the change cycle of the analog values outputted from the wheel speed sensors 1A to 1D with the sampling cycle. Accordingly, the variation of digital values can surely be obtained while the vehicle is running.

After the sampling cycle is changed at Step S11, the procedure proceeds to Step S8, where the previous digital value is updated by the digital value obtained at the changed sampling cycle.

Next, an operation of the embodiment will be described. The electronic control unit 4 judges whether or not the respective waveform converting means 2A to 2D output a pulse signals corresponding to the speed equal to or less than the minimum wheel speed VWL that can be detected with the wheel speed sensors 1A to 1D, with respect to each of the waveform converting means 2A to 2D. When the electronic control unit 4 judges that the respective waveform converting means 2A to 2D output the pulse signals corresponding the speed equal to or less than the minimum wheel speed VWL, and then the variation of digital values, which are obtained by converting the analog values outputted from the wheel speed sensors 1A to 1D at the preset sampling cycles, exceeds the threshold value, it is judged that there exists a failure in at least either of the waveform converting means 2A to 2D themselves, and between the waveform converting means 2A to 2D and the electronic control unit 4.

In a case where the pulse signals outputted from the waveform converting means 2A to 2D corresponding to wheel speeds correspond to the speed equal to or less than the minimum wheel speed VWL that can be detected with the wheel speed sensors 1A to 1D, there are assumed three conditions. These conditions are such as a condition in which the wheel speed sensors 1A to 1D themselves fail, a condition in which there exists a failure in at least either of the waveform converting means 2A to 2D corresponding to the wheel speed sensors 1A to 1D themselves, and between the waveform converting means 2A to 2D and the electronic control unit 4, and a condition in which the vehicle is stopped. On the other hand, in a case where the variation of the digital values, which is obtained by converting the analog values outputted from the wheel speed sensors at the preset sampling cycle, exceeds a certain magnitude, it is judged that the wheel speed sensors 1A to 1D themselves do not fail and the vehicle is running. Accordingly, when it is judged that the vehicle is running based on the fact that the variation of the digital values exceeds the threshold value even though only the pulse signals corresponding to the speed equal to or less than the minimum speed are outputted from the waveform converting means 2A to 2D, it can be judged that a failure exists in at least either of the waveform converting means 2A to 2D themselves corresponding to the wheel speed sensors 1A to 1D, and between the waveform converting means 2A to 2D and the electronic control unit 4. As a result, effective pulse signals cannot be obtained from the waveform converting means 2A to 2D. The failure in between the waveform converting means 2A to 2D and the electronic control unit is, for instance, a disconnection or a short circuit.

Moreover, a failure diagnosis is performed with respect to each of the wheel speed sensors 1A to 1D based on the variation of the digital values obtained by converting the analog values in a state in which the wheel speeds corresponding to the pulse signals are equal to or less than the minimum wheel speed VWL. Accordingly, even if the some wheels have wheel diameters different from those of other wheels or the respective waveform converting means 2A to 2D fail all together at one time due to them being integrated into a single IC chip 3, such the failure diagnosis can surely be performed.

In addition, since such a failure diagnosis can be performed with a single electronic unit 4 without using two microcomputers, the construction of the circuit can be made simple.

Further, when the variation of digital values is equal to or less than the threshold value, the electronic control unit 4 changes the sampling cycle at which analog values outputted from the wheel speed sensors 1A to 1D are converted into digital values. Accordingly, a coincidence of the change cycle of analog values with the sampling cycle for A/D conversion can be prevented, and thereby, it can be avoided to mistaken judge that the variation of digital values is equal to or less than the threshold value though the vehicle is running.

As is described heretofore, according to the present invention, even if some wheels have wheel diameters different from that of other wheels or the respective waveform converting means fail all together at one time due to all of them being integrated into a single IC chip, it is possible to surely diagnose a failure in at least either of the waveform converting means themselves, and between the waveform converting means and the electronic control unit, with a simple circuit construction.

In addition, according to the present invention, it is possible to prevent a coincidence of the change cycle of analog values outputted from the wheel speed sensors with the sampling cycle, thereby to avoid a risk of a mistaken judgement that the variation of digital values is equal to or less than the threshold value while the vehicle is in a running state. Thus, the embodiment of the present invention has been described in detail heretofore. The present invention, however, is not limited to the above-described embodiment and it may be variously modified without departing from the scope and spirit of the present invention as defined in Claims thereof.

What is claimed is:

1. An apparatus for diagnosing a wheel speed input system in a vehicle motion control apparatus comprising:

a first wheel speed sensor outputting a first analog signal corresponding to a wheel speed of a first wheel;

a second wheel speed sensor outputting a second analog signal corresponding to a wheel speed of a second wheel;

a first waveform converting means for converting the first analog signal into a first pulse signal;

a second waveform converting means for converting the second analog signal into a second pulse signal; and an electronic control unit which controls an operation of an actuator which modifies a motion of a vehicle in response to said first and second pulse signals, receives first and second analog values outputted from said first and second wheel speed sensors, judges whether or not each of said first and second waveform converting means outputs a third pulse signal which is in correspondence with a wheel speed equal to or less than a minimum wheel speed that can be detected with said first and second wheel speed sensors, converts said first analog values into a first digital value at a predetermined sampling cycle when said electronic control unit judges that said first waveform converting means outputs the third pulse signal, and judges a failure in at least either of an operation of said first waveform converting means itself and an operation between said first waveform converting means and said electronic control unit in accordance with a variation of adjacent digital values thus sampled at said predetermined sampling cycle.

2. The apparatus according to claim 1, wherein when said variation of the adjacent digital values exceeds a threshold value, said electronic control unit judges that there exists said failure.

3. The apparatus according to claim 2, wherein said electronic control unit changes said sampling cycle to the other sampling cycle, when said variation of digital values is equal to or less than said threshold value.

4. The apparatus according to claim 2, wherein said first and second wheel speed sensors comprises a front right wheel speed sensor, a front left wheel speed sensor, a rear right wheel speed sensor and a rear left wheel speed sensor.

5. The apparatus according to claim 1, wherein said electronic control unit further converts said second analog values into a second digital value at a given sampling cycle when said electronic control unit judges that said second waveform converting means outputs the third pulse signal, judges a failure in at least either of an operation of said second waveform converting means itself and an operation between said second waveform converting means and said electronic control unit in accordance with a variation of adjacent digital values thus sampled at said given sampling cycle.

6. A method for diagnosing a wheel speed input system in a vehicle motion control apparatus comprising, a first wheel speed sensor outputting a first analog signal corresponding to a wheel speed of a first wheel, a second wheel speed sensor outputting a second analog signal corresponding to a wheel speed of a second wheel, a first waveform converting means for converting the first analog signal into a first pulse signal, a second waveform converting means for converting the second analog signal into a second pulse signal, and an electronic control unit controlling an operation of an actuator which modifies a motion of a vehicle in response to said first and second pulse signals, said method comprising the steps of:

receiving first and second analog values outputted from said first and second wheel speed sensors;

judging whether or not each of said first and second waveform converting means outputs a third pulse signal which is in correspondence with a wheel speed equal to or less than a minimum wheel speed that can be detected with said first and second wheel speed sensors;

converting said first analog values into a first digital value at a predetermined sampling cycle when said electronic control unit judges that said first waveform converting means outputs the third pulse signal; and judging a failure in at least either of an operation of said first waveform converting means itself and an operation between said first waveform converting means and said electronic control unit in accordance with a variation of adjacent digital values thus sampled at said predetermined sampling cycle.

7. The method according to claim 6, wherein said failure judging step comprises the step of:

judging that there exists said failure when said variation of the adjacent digital values exceeds a threshold value.

8. The method according to claim 7, further comprising the step of:

changing said sampling cycle to the other sampling cycle, when said variation of digital values is equal to or less than said threshold value.

9. The method according to claim 6, further comprising the steps of:

converting said second analog value into a second digital value at a given sampling cycle when said electronic control unit judges that said second waveform converting means outputs the third pulse signal; and judging a failure in at least either of an operation of said second waveform converting means itself and an operation between said second waveform converting means and said electronic control unit in accordance with a variation of adjacent digital values thus sampled at said given sampling cycle.

10. A diagnostic device for a wheel speed input system for a vehicle motion control device comprising:

wheel speed sensors (1A, 1B, 1C, 1D) corresponding individually to a plurality of wheels;

a plurality of waveform converting means (2A, 2B, 2C, 2D) for waveform converting analog signals outputted individually from said respective wheel speed sensors (1A to 1D) into individual pulse signals corresponding to wheel speeds of said respective wheel speed sensors; and an electronic control unit (4) for controlling the operation of an actuator (5) that can modify the motion of a vehicle in response to wheel speeds obtained based on outputs from said respective waveform converting means (2A to 2D), wherein said electronic control unit (4) judges whether or not said waveform converting means (2A to 2D) output a pulse signal corresponding to a speed equal to or less than a minimum wheel speed that can be detected with said wheel speed sensors (1A to 1D) with respect to each of said waveform converting means (2A to 2D), and wherein when said electronic control unit judges that said waveform converting means (2A to 2D) output a pulse signal corresponding to said speed equal to or less than the minimum wheel speed, said electronic control unit judges that there exists a failure in at least either of said waveform converting means (2A to 2D) themselves which are outputting a pulse signal corresponding to said speed equal to or less than the minimum wheel speed and somewhere between said waveform converting means (2A to 2D) and said electronic control unit (4) based on a fact that a variation of digital values which are obtained by converting at a predetermined sampling cycle analog values outputted from said wheel speed sensors (1A to 1D) corresponding to said waveform converting means (2A to 2D) so judged exceeds a threshold value.

11. The diagnostic device for a wheel speed input system for a vehicle motion control device as set forth in claim 10, wherein said electronic control unit (4) changes said sampling cycle at which analog values outputted from said wheel speed sensors (1A to 1D) are converted into digital values when said variation of digital values is equal to or less than said threshold value.

* * * * *